United States Patent
Radeloff et al.

[19]

[11] Patent Number: 6,157,301
[45] Date of Patent: Dec. 5, 2000

[54] MARKER FOR USE IN A MAGNETIC ELECTRONIC ARTICLE SURVEILLANCE SYSTEM

[75] Inventors: Christian Radeloff, Bruchkoebel; Gernot Hausch, Langenselbold; Ottmar Roth, Gruendau, all of Germany

[73] Assignee: Vacuumschmelze GmbH, Hanau, Germany

[21] Appl. No.: 09/331,146

[22] PCT Filed: Dec. 10, 1997

[86] PCT No.: PCT/DE97/02882

§ 371 Date: Jun. 11, 1999

§ 102(e) Date: Jun. 11, 1999

[87] PCT Pub. No.: WO98/26434

PCT Pub. Date: Jun. 18, 1998

[30] Foreign Application Priority Data

Dec. 13, 1996 [DE] Germany ............................ 196 52 004

[51] Int. Cl.[7] ................................................. G08B 13/14
[52] U.S. Cl. .................................... 340/572.6; 340/568.1; 148/310
[58] Field of Search .............................. 340/572.1, 572.6, 340/571, 568.1, 551, 567, 572.2; 148/310, 315

[56] References Cited

U.S. PATENT DOCUMENTS

| | | |
|---|---|---|
| 3,971,676 | 7/1976 | Detert et al. . |
| 4,298,862 | 11/1981 | Gregor et al. . |
| 4,391,656 | 7/1983 | Jin et al. . |
| 4,415,380 | 11/1983 | Jin et al. . |
| 4,510,489 | 4/1985 | Anderson, III et al. ................. 340/572 |
| 4,536,229 | 8/1985 | Jin et al. ............................... 148/31.55 |
| 4,960,651 | 10/1990 | Pettigrew et al. ....................... 428/607 |
| 5,313,192 | 5/1994 | Ho et al. ................................. 340/551 |
| 5,539,380 | 7/1996 | Hasegawa et al. ..................... 340/551 |
| 5,653,824 | 8/1997 | Manning et al. ....................... 148/306 |

FOREIGN PATENT DOCUMENTS

| | | |
|---|---|---|
| 0 096 182 | 12/1983 | European Pat. Off. . |
| 0 121 649 | 10/1984 | European Pat. Off. . |
| 0 634 759 | 1/1995 | European Pat. Off. . |
| OS 31 20 168 | 2/1982 | Germany . |
| OS 40 09 010 | 9/1991 | Germany . |
| WO 90/03652 | 4/1990 | WIPO . |

OTHER PUBLICATIONS

Ferromagnetic Materials Structure and Properties, McCurrie (1994), pp. 211–266.

"Ferromagnetism," Bozorth (1951), pp. 134–152.

*Primary Examiner*—Jeffery A. Hofsass
*Assistant Examiner*—Daniel Previl
*Attorney, Agent, or Firm*—Schiff Hardin & Waite

[57] ABSTRACT

A semihard magnetic alloy for activation strips in magnetic antitheft systems contains 0.1 to 10% by weight Ni, 0.1 to 15% by weight Cr, 0.1 to 15% by weight Mo and Fe making up the rest with an overall proportion of Fe, Ni and Mo of less than 95% by weight of the alloy. The alloy is distinguished with respect to known alloys in use by its excellent magnetic properties and high resistance to corrosion. Furthermore, the alloy can be excellently cold shaped before tempering.

18 Claims, 3 Drawing Sheets

MARKER FOR USE IN A MAGNETIC ELECTRONIC ARTICLE SURVEILLANCE SYSTEM

BACKGROUND OF THE INVENTION

1. Field of the Invention

The present invention relates to a marker (also called a tag or a label) for use in a magnetic electronic article surveillance system (EAS), the marker being of the type having an elongated alarm strip composed of an amorphous ferromagnetic alloy and at least one activation strip composed of a semi-hard magnetic alloy.

2. Description of the Prior Art

Magnetic antitheft systems and markers are well known and have been described in detail, for example, in European Application-0 121 649 and in PCT Application WO 90/03652. On the one hand, there are magnetoelastic systems in which the activation strip serves to activate the alarm strip by magnetization and, on the other hand, there are harmonic systems in which the activation strip serves, after its magnetization, to deactivate the alarm strip.

The alloys with semihard magnetic properties which are used for premagnetization strips include Co—Fe—V alloys, which are known as Vicalloy, Co—Fe—Ni alloys, which are known as Vacozet, and Fe—Co—Cr alloys. These known semihard magnetic alloys contain high proportions of cobalt, in some cases of at least 45% by weight, and are correspondingly expensive. In addition, these alloys are brittle in the magnetically final-annealed state, so that they do not have sufficient ductility to meet sufficiently the requirements for the display elements for antitheft systems. It is in fact a requirement for the display elements in magnetic antitheft systems that they have to be insensitive to bending and deformation.

In addition, the approach now being adopted is to introduce the display elements of antitheft systems directly into the product to be protected (source tagging). As a result, there is additionally the need to be able to magnetize the semihard magnetic alloys even from a relatively large distance or with relatively small fields. It has become apparent that the coercive force has to be restricted to values of 60 A/cm at maximum.

On the other hand, however, sufficient opposing field stability, as a result of which the lower limit of the coercive force is defined, is also required. Only coercive forces of at least 30 A/cm are suitable for this.

SUMMARY OF THE INVENTION

It is an object of the present invention to provide a marker for an electronic article surveillance system which has a pre-magnetization strip which satisfies the aforementioned requirements of having properties which are relatively insensitive to bending and deformation of the marker, and a coercive force between 30 and 60 A/cm.

This object is achieved according to the invention in a marker having a premagnetization strip comprising a semi-hard magnetic alloy which is composed of 0.1 to 10% by weight nickel, 0.1 to 15% by weight chrome, 0.1 to 15% by weight molybdenum and iron making up the rest with an overall proportion of iron, nickel and molybdenum of less than 95% by weight of the alloy.

The alloy may also contain 0 to 5% by weight cobalt and/or at least one of the elements Mn, Ti, Zr, Hf, V, Nb, Ta, W, Cu, Al, Si in individual proportions of less than 0.5% by weight of the alloy and with an overall proportion of less than 1% by weight of the alloy and/or at least one of the elements C, N, S, P, B, H, O in individual proportions of less than 0.2% by weight of the alloy and with an overall proportion of less than 1% by weight of the alloy. The alloy is distinguished by a coercive force $H_c$ of 30 to 60 A/cm and a remanence $B_r$ of at least 1.0 T (10,000 gauss).

The alloys according to the invention are ductile and can be excellently cold shaped before tempering, with the result that even reductions in cross section of more than 90% are possible. Premagnetization strips can be manufactured from such alloys, in particular by cold rolling, with thicknesses of 0.04 to 0.07 mm. In addition, the alloys according to the invention are distinguished by excellent magnetic properties and by high resistance to corrosion.

In a further embodiment of the invention has a pre-magnetization strip comprised of a semihard magnetic alloy which contains 3 to 9% by weight nickel, 5 to 11% by weight chrome and 6 to 12% by weight molybdenum.

Typically, the premagnetization strips are manufactured by melting the alloy under vacuum and casting it to form a cast block. Subsequently, the cast block is hot rolled to form a strip at temperatures above approximately 800° C., then intermediately annealed at a temperature of approximately 1100° C. and then rapidly cooled. Subsequently, cold shaping, expediently cold rolling, takes place corresponding to a reduction in cross section of at least 75%, preferably 85% or higher. The last step is to temper the cold rolled strip at temperatures of approximately 500° C. to 800° C. Then, the premagnetization strips are cut to length.

DESCRIPTION OF THE PREFERRED EMBODIMENTS

Figure 3:
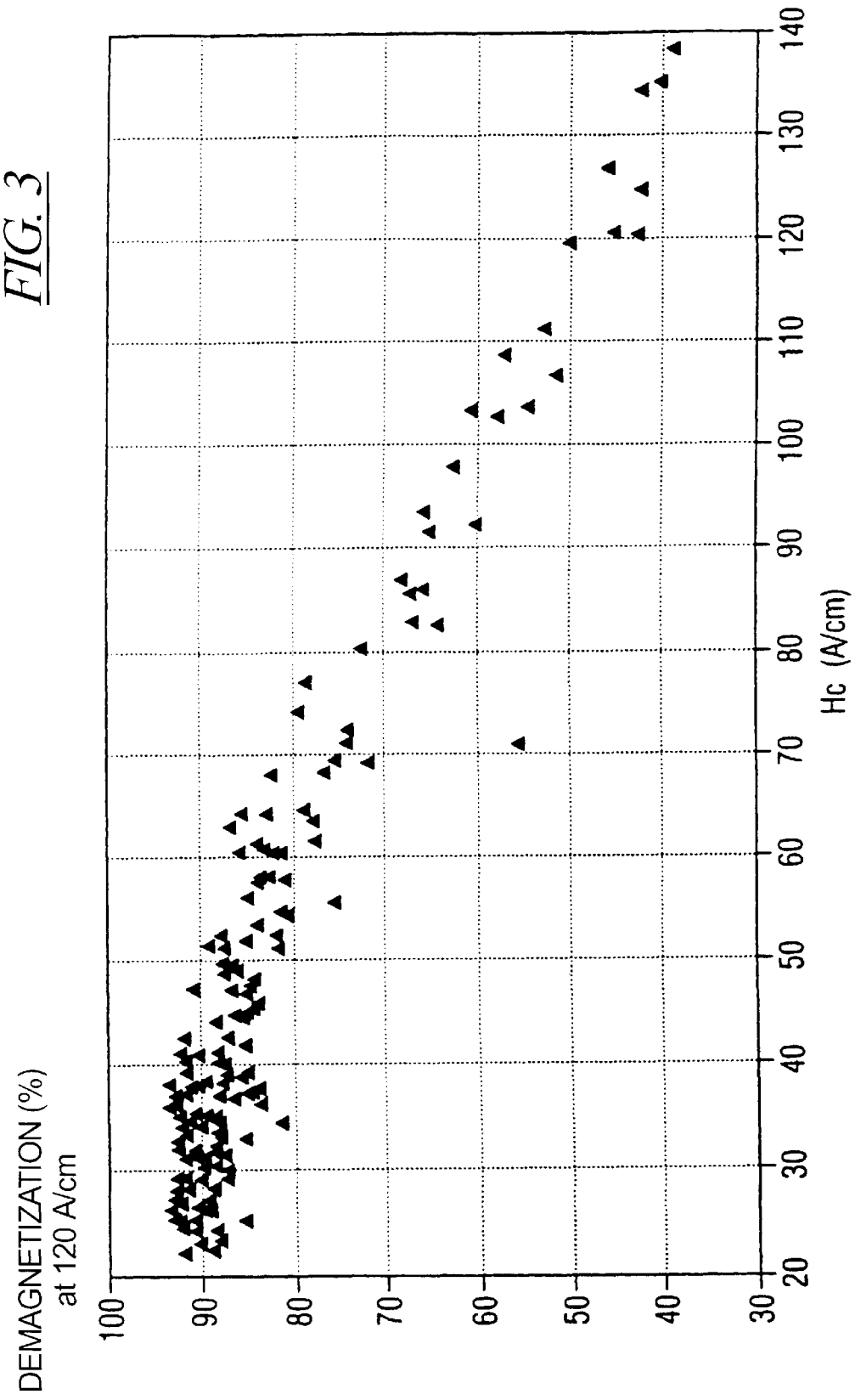
FIG. 3 shows the demagnetization characteristics at 120 A/cm of Fe—Ni—Mo—Cr alloys of the invention, as a function of coercive force.

The following three requirements arise for an alloy to be suitable for an activation strip in an antitheft system, in particular for so-called "source tagging":

The ratio of the remanence $B_r$ at a given low magnetization field strength with respect to the remanence $B_r$ in the case of a magnetic field in the kOe range is to be virtually 1. FIG. 3 illustrates this for the alloys according to the invention.

The opposing field stability is to be constituted in such a way that the remanence $B_r$ after an opposing field of several 10 A/cm always retains 95% of its original value.

Finally, the permanent magnetic induction $B_r$ after a demagnetization cycle with a prescribed magnetic field is to retain only 10% of the original value.

In particular this means that magnetization of the activation strip, i.e. activation/deactivation of the display element, can also take place locally. However, as a rule only small fields are available locally. The remanence which is achieved is to differ only slightly from the value for high magnetization fields in order to guarantee the same behavior of the display elements.

Figure 2:
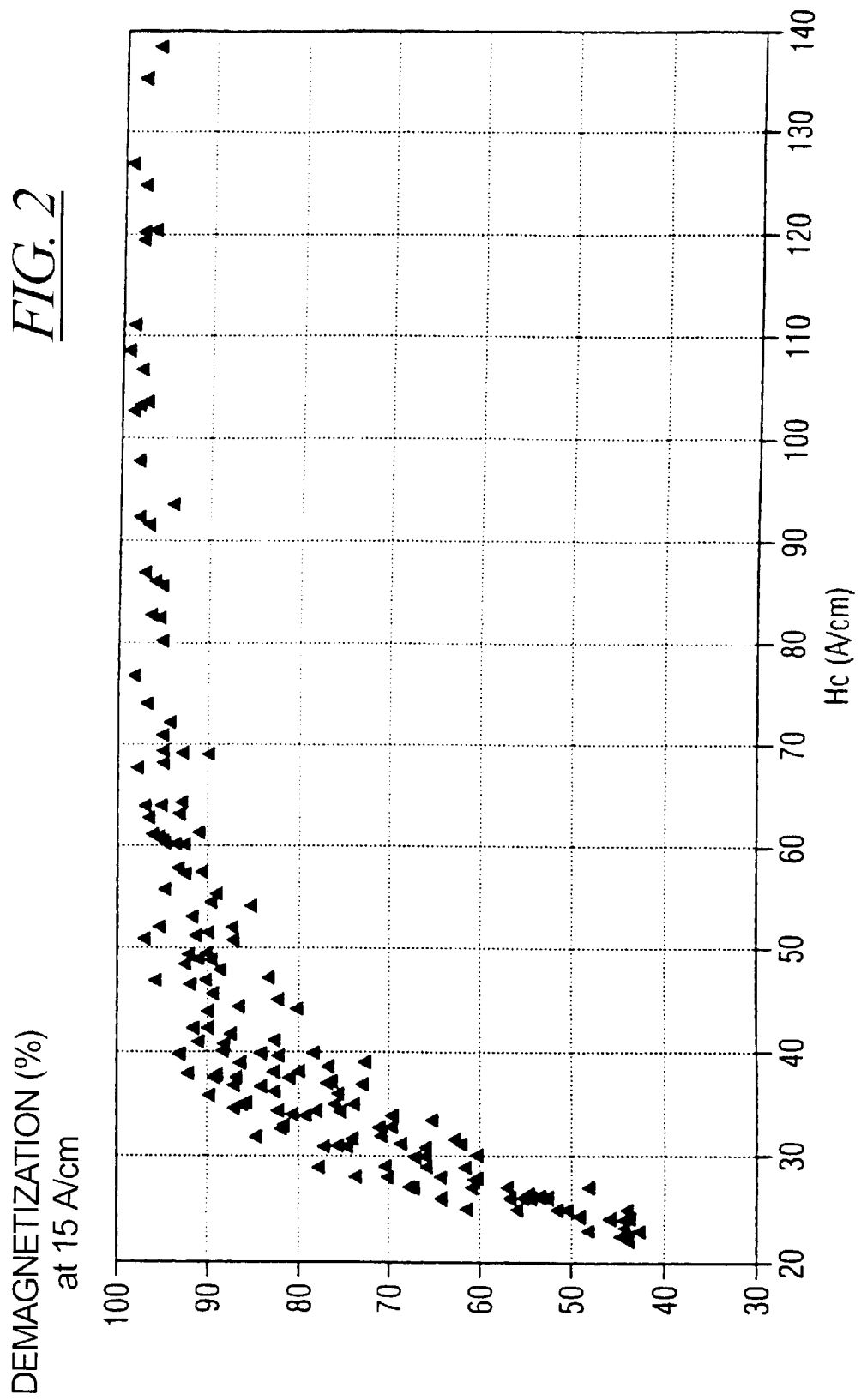
FIG. 2 shows the demagnetization characteristics at 15 A/cm of Fe—Ni—Mo—Cr alloys of the invention, as a function of coercive force.

The display elements must be constituted in such a way that, in the vicinity of the coils in the detection barriers, they change their remanence $B_r$ only to a small degree as a result of a field which is increased there or possibly oriented in the opposite direction. As can be seen in FIG. 2, the alloys according to the invention have such a necessary opposing field stability.

Figure 1:
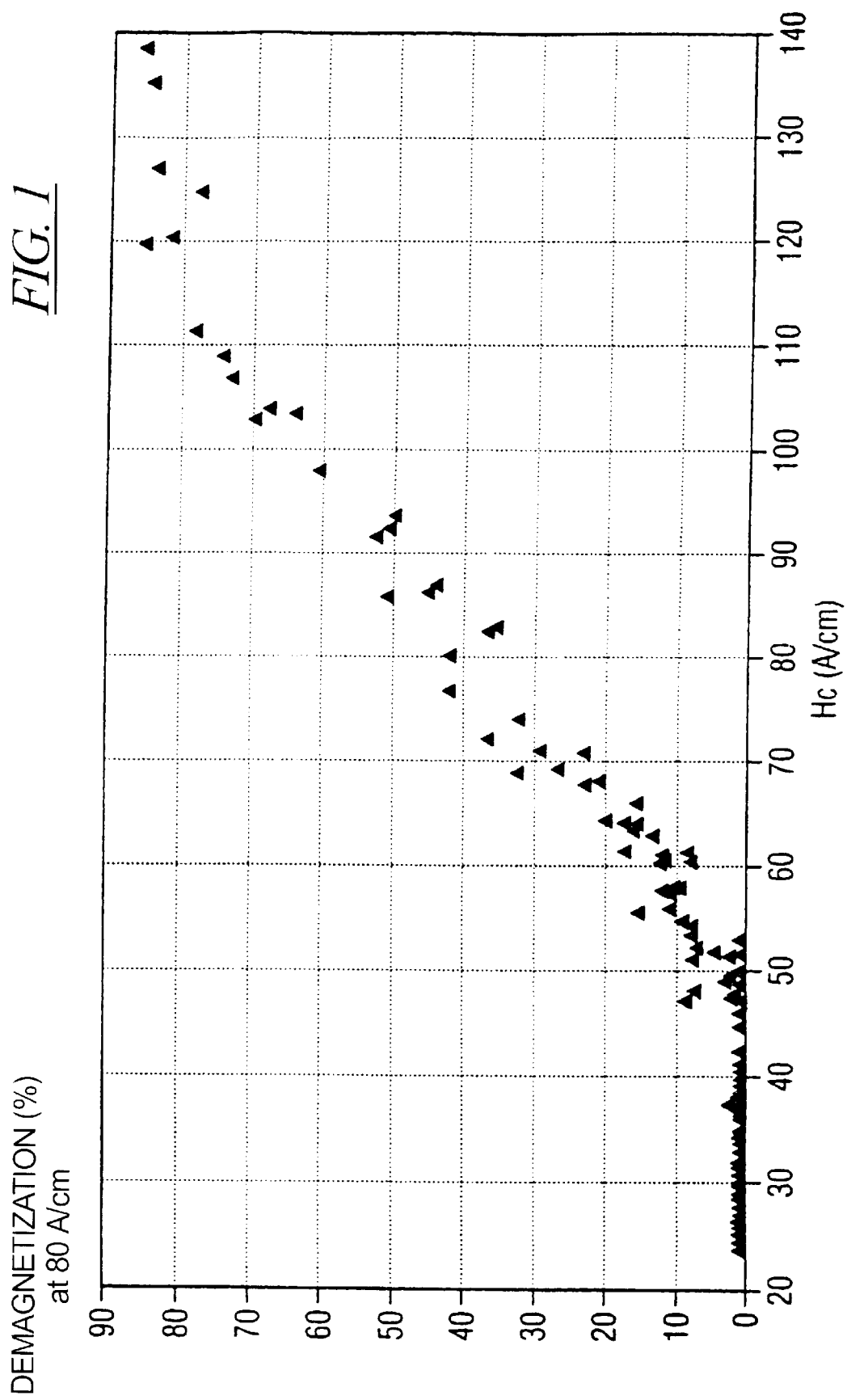
FIG. 1 shows the demagnetization characteristics at 80 A/cm of Fe—Ni—Mo—Cr alloys of the invention, as a function of coercive force.

Finally, it must be possible to use relatively small fields to demagnetize the display elements, i.e. deactivate them in the case of magnetoelastic display elements and/or reactivate them in the case of harmonic ones. FIG. 1 shows these relationships for the alloys according to the invention.

Simultaneously fulfilling the abovementioned three requirements results in very severe restrictions on the available ranges of the coercive forces $H_c$, since the three requirements oppose one another.

The present alloys are typically manufactured by casting a melt comprising the components Fe, Mo, Ni and Cr in a crucible or oven under vacuum or in an inert atmosphere. The temperatures here are approximately 1600° C.

A round mold is used for casting. The cast bars made of the above alloys are then typically processed by hot shaping, intermediate annealing, cold shaping and further intermediate annealing. The intermediate annealing is carried out for the purpose of homogenization, grain refinement, deformation or in order to form desirable, mechanical properties, in particular high ductility.

An excellent structure is achieved, for example, by means of the following processing: hot treatment at temperatures preferably above 800° C., rapid cooling and tempering. Preferred tempering temperatures are 500 to 800° C., and the tempering times are typically 1 minute to 24 hours. Using the alloys according to the invention, it is possible to carry out, before the tempering, in particular cold shaping corresponding to a reduction in cross section of at least 75%.

The tempering step makes it possible to increase the coercive force and the rectangularity of the magnetic B-H loop, which is essential for the requirements made of premagnetization strips.

The manufacturing method for particularly good premagnetization strips comprises the following steps:

1. casting at 1600° C.,
2. hot rolling of the cast block at temperatures above 800° C.,
3. intermediate annealing at approximately 1100° C. for 1 hour,
4. rapid cooling in water,
5. cold rolling,
6. intermediate annealing at approximately 1100° C. for 1 hour,
7. rapid cooling in water,
8. cold shaping corresponding to a reduction in cross section of 90% and
9. tempering at approximately 650° C. for a number of hours,
10. cutting the activation strips to length.

These methods were used to manufacture activation strips which have an excellent coercive force $H_c$ and a very good remanence $B_r$. The magnetization properties and the opposing field stability were outstanding.

The manufacture of Fe—Mo—Ni—Cr activation strips of the type in question will now be described in detail by means of the following examples.

EXAMPLE 1

An alloy with 4.1% by weight nickel, 8.0% by weight molybdenum, 8.0% by weight chrome and iron making up the rest was molten under vacuum, the resulting cast bar was hot rolled at approximately 900° C., intermediately annealed at 1100° C. for 1 hour and rapidly cooled in water. After subsequent cold rolling, the resulting strip was intermediately annealed once more at 1100° C. for 1 hour and rapidly cooled in water. The strip was then cold rolled corresponding to a reduction in cross section of 90% and tempered at 650° C. for 3 hours and air-cooled. A coercive force $H_c$=48 A/cm and a remanence $B_r$=1.15 T was measured.

EXAMPLE 2

An alloy with 5.9% by weight nickel, 10.1% by weight molybdenum, 8.5% by weight chrome and iron making up the rest was processed as according to Example 1, but cold rolled corresponding to a reduction in cross section of 95% and tempered at a temperature of 600° C. A coercive force $H_c$ of 60 A/cm and a remanence $B_r$ of 1.07 T was measured.

EXAMPLE 3

An alloy with 4.0% by weight nickel, 8.3% by weight molybdenum, 10.4% by weight chrome, 0.3% by weight titanium and iron making up the rest was manufactured as in Example 1. However, here the strip was cold rolled corresponding to a reduction in cross section of 95% and subsequently tempered at 625° C. A coercive field strength $H_c$ of 35 A/cm and a remanence $B_r$ of 1.12 T was measured.

EXAMPLE 4

An alloy with 4.1% by weight nickel, 8.0% by weight molybdenum, 9.9% by weight chrome and iron making up the rest was manufactured as in Example 1. However, the strip was cold rolled corresponding to a reduction in cross section of 95% and tempered at a temperature of 625° C. A coercive field strength $H_c$ of 47 A/cm and a remanence $B_r$ of 1.12 T was measured.

In all the exemplary embodiments, satisfactory magnetization characteristics and a usable degree of opposing field stability were obtained.

Although modifications and changes may be suggested by those skilled in the art, it is the intention of the inventors to embody within the patent warranted hereon all changes and modifications as reasonably and properly come within the scope of their contribution to the art.

What is claimed is:

1. A marker for a magnetic electronic article surveillance system, said marker comprising:

an oblong alarm-triggering strip composed of an amorphous ferromagnetic alloy;

at least one oblong activation strip composed of a semi-hard magnetic alloy, applied along said alarm-triggering strip;

said semi-hard magnetic alloy comprising 3 through 9 wt % Ni, 5 through 11 wt % Cr, 6 through 12 wt % Mo, and Fe such that an overall weight percent of Fe, Ni and Mo is less than 95 wt % of said semi-hard magnetic alloy; and said semi-hard magnetic alloy having a coercive force $H_c$ in a range between 30 and 60 A/cm and a remanence $B_r$ of at least 1.0 T.

2. A marker as claimed in claim 1, wherein said semi-hard magnetic alloy also comprises 0–5 wt % Co.

3. A marker as claimed in claim 2, wherein said semi-hard magnetic alloy also comprises at least one first element selected from the group consisting of Mn, Ti, Zr, Hf, V Nb, Ta, W, Cu, Al and Si, with any individual first element being less than 0.5 wt % of said semi-hard magnetic alloy and all first elements being less than 1 wt % of the semi-hard magnetic alloy.

4. A marker as claimed in claim 3, wherein said semi-hard magnetic alloy further includes at least one second element selected from the group consisting of C, N, S, P, B, H and O with any individual second element being less than 0.2 wt % of the semi-hard magnetic alloy, and all second elements being less than 1 wt % of the semi-hard magnetic alloy.

5. A marker as claimed in claim 2, wherein said semi-hard magnetic alloy includes at least one element selected from the group consisting of C, N, S, P, B, H and O with any individual element being less than 0.2 wt % of the semi-hard magnetic alloy, and all elements being less than 1 wt % of the semi-hard magnetic alloy.

6. A marker as claimed in claim 1, wherein the semi-hard magnetic alloy includes at least one first element selected from the first group consisting of Mn, Ti, Zr, Hf, V, Nb, Ta, Cu, Al, and Si, with any individual first element being less than 0.5 wt % of the semi-hard magnetic material and all first element being less than 1 wt % of the semi-hard magnetic alloy.

7. A marker as claimed in claim 6, wherein the semi-hard magnetic material including at least one second element selected from the group consisting of C, N, S, P, B, H and O with any individual second element being less than 0.2 wt % of the semi-hard magnetic material and all second elements being less than 1 wt % of the semi-hard magnetic alloy.

8. A marker as claimed in claim 1, wherein the semi-hard magnetic alloy includes at least one element selected from a group consisting of C, N, S, P, B, H and O with any individual element being less than 0.2 wt % of the semi-hard magnetic alloy and all elements being less than 1 wt % of the semi-hard magnetic alloy.

9. A method for manufacturing an activation strip for a marker in a magnetic electronic article surveillance system, comprising the steps of:

providing a semi-hard magnetic alloy comprising 3 through 9 wt % Ni, 5 through 11 wt % Cr, 6 through 12 wt % Mo, and Fe such that an overall weight percent of Fe, Ni and Mo is less than 95 wt % of said semi-hard magnetic alloy and said semi-hard magnetic alloy having a coercive force $H_c$ in a range between 30 and 60 A/cm and a remanence $B_r$ of at least 1.0 T;

melting said alloy in an atmosphere selected from the group of atmospheres comprising a vacuum and a protective atmosphere and casting said alloy into a cast block;

hot-working said cast block into a ribbon at a temperature above approximately 800° C.;

annealing said ribbon at a temperature of approximately 1100° C. to obtain annealed ribbon;

rapidly cooling said annealed ribbon to obtain cooled ribbon having a cross-section;

cold-working said cooled ribbon to reduce the cross-section thereof by at least 85% to obtain a cold-worked ribbon;

tempering said cold-worked ribbon at a temperature in a range between 500° C. and 800° C. to obtain a tempered ribbon; and cutting said tempered ribbon into a plurality of actuation strips each having a predetermined length.

10. A method according to claim 9, wherein said semi-hard magnetic alloy also comprises 0–5 wt % Co.

11. A method according to claim 10, wherein said semi-hard magnetic alloy also comprises at least one first element selected from the group consisting of Mn, Ti, Zr, Hf, V Nb, Ta, W, Cu, Al and Si, with any individual first element being less than 0.5 wt % of said semi-hard magnetic alloy and all first elements being less than 1 wt % of the semi-hard magnetic alloy.

12. A method according to claim 11, wherein said semi-hard magnetic alloy further includes at least one second element selected from the group consisting of C, N, S, P, B, H and O with any individual second element being less than 0.2 wt % of the semi-hard magnetic alloy, and all second elements being less than 1 wt % of the semi-hard magnetic alloy.

13. A method according to claim 10, wherein said semi-hard magnetic alloy includes at least one element selected from the group consisting of C, N, S, P, B, H and O with any individual element being less than 0.2 wt % of the semi-hard magnetic alloy, and all elements being less than 1 wt % of the semi-hard magnetic alloy.

14. A method according to claim 9, wherein the semi-hard magnetic alloy includes at least one first element selected from the first group consisting of Mn, Ti, Zr, Hf, V, Nb, Ta, Cu, Al, and Si, with any individual first element being less than 0.5 wt % of the semi-hard magnetic material and all first element being less than 1 wt % of the semi-hard magnetic alloy.

15. A method according to claim 14 wherein the semi-hard magnetic material including at least one second element selected from the group consisting of C, N, S, P, B, H and 0 with any individual second element being less than 0.2 wt % of the semi-hard magnetic material and all second elements being less than 1 wt % of the semi-hard magnetic alloy.

16. A method according to claim 9, wherein the semi-hard magnetic alloy includes at least one element selected from a group consisting of C, N, S, P, B, H and O with any individual element being less than 0.2 wt % of the semi-hard magnetic alloy and all elements being less than 1 wt % of the semi-hard magnetic alloy.

17. A marker for a magnetic electronic article surveillance system, said marker comprising:

an oblong alarm-triggering strip composed of an amorphous ferromagnetic alloy;

at least one oblong activation strip applied along said alarm-triggering strip and composed of a semi-hard magnetic alloy;

said semi-hard magnetic alloy comprising 0.1 through 10 wt % Ni, 0.1 through 15 wt % Cr, 0.1 through 15 wt % Mo, 0 through 0.2 wt % C and Fe such that an overall weight percent of Fe, Ni and Mo is less than 95 wt % of said semi-hard magnetic alloy; and said semi-hard magnetic alloy having a coercive force $H_c$ in a range between 30 and 60 A/cm and a remanence $B_r$ of at least 1.0 T.

18. A method for manufacturing an activation strip for a marker in a magnetic electronic article surveillance system, comprising the steps of:

providing a semi-hard magnetic alloy comprising 0.1 through 10 wt % Ni, 0.1 through 15 wt % Cr, 0.1 through 15 wt % Mo, 0 through 0.02 wt % C and Fe such that an overall weight percent of Fe, Ni and Mo is less than 95 wt % of said semi-hard magnetic alloy and said semi-hard magnetic alloy having a coercive force $H_c$ in a range between 30 and 60 A/cm and a remanence $B_r$ of at least 1.0 T;

melting said alloy in an atmosphere selected from the group of atmospheres comprising a vacuum and a protective atmosphere and casting said alloy into a cast block;

hot-working said cast block into a ribbon at a temperature above approximately 800° C.;

annealing said ribbon at a temperature of approximately 1100° C. to obtain annealed ribbon;

rapidly cooling said annealed ribbon to obtain cooled ribbon having a cross-section;

cold-working said cooled ribbon to reduce the cross-section thereof by at least 85% to obtain a cold-worked ribbon;

tempering said cold-worked ribbon at a temperature in a range between 500° C. and 800° C. to obtain a tempered ribbon; and cutting said tempered ribbon into a plurality of actuation strips each having a predetermined length.

* * * * *